(12) United States Patent
Dabbiere

(10) Patent No.: US 8,914,013 B2
(45) Date of Patent: Dec. 16, 2014

(54) DEVICE MANAGEMENT MACROS

(71) Applicant: Sky Socket, LLC, Atlanta, GA (US)

(72) Inventor: Alan Dabbiere, McLean, VA (US)

(73) Assignee: Airwatch LLC, Atlanta, GA (US)

( * ) Notice: Subject to any disclaimer, the term of this patent is extended or adjusted under 35 U.S.C. 154(b) by 0 days.

(21) Appl. No.: 13/870,402

(22) Filed: Apr. 25, 2013

(65) Prior Publication Data

US 2014/0325204 A1    Oct. 30, 2014

(51) Int. Cl.
| | | |
|---|---|---|
| *H04M 3/00* | (2006.01) |
| *G06F 9/445* | (2006.01) |
| *H04W 8/24* | (2009.01) |
| *H04W 12/06* | (2009.01) |
| *H04M 1/725* | (2006.01) |

(52) U.S. Cl.
CPC ........... *G06F 9/44505* (2013.01); *H04W 8/245* (2013.01); *H04W 12/06* (2013.01); *H04M 1/72519* (2013.01)
USPC ........... 455/418; 455/550.1; 455/411; 700/65

(58) Field of Classification Search
CPC . H04W 8/245; H04M 12/06; H04M 1/72519; G05B 15/02
USPC .......................... 455/418, 550.1, 411; 700/65
See application file for complete search history.

(56) References Cited

U.S. PATENT DOCUMENTS

| | | | |
|---|---|---|---|
| 5,864,683 A | 1/1999 | Boebert et al. |
| 5,928,329 A | 7/1999 | Clark et al. |
| 5,961,590 A | 10/1999 | Mendez et al. |
| 5,974,238 A | 10/1999 | Chase, Jr. |
| 6,023,708 A | 2/2000 | Mendez et al. |
| 6,085,192 A | 7/2000 | Mendez et al. |
| 6,131,096 A | 10/2000 | Ng et al. |
| 6,131,116 A | 10/2000 | Riggins et al. |
| 6,151,606 A | 11/2000 | Mendez |
| 6,233,341 B1 | 5/2001 | Riggins |
| 6,269,369 B1 | 7/2001 | Robertson |
| 6,463,470 B1 | 10/2002 | Mohaban et al. |
| 6,560,772 B1 | 5/2003 | Slinger |
| 6,606,662 B2 | 8/2003 | Nagasaki |
| 6,668,322 B1 | 12/2003 | Wood et al. |
| 6,708,221 B1 | 3/2004 | Mendez et al. |
| 6,714,859 B2 | 3/2004 | Jones |
| 6,726,106 B1 | 4/2004 | Han et al. |
| 6,727,856 B1 | 4/2004 | Hill |
| 6,741,232 B1 | 5/2004 | Siedlikowski et al. |
| 6,741,927 B2 | 5/2004 | Jones |
| 6,766,454 B1 | 7/2004 | Riggins |
| 6,779,118 B1 | 8/2004 | Ikudome et al. |
| 6,904,359 B2 | 6/2005 | Jones |
| 6,965,876 B2 | 11/2005 | Dabbiere |
| 6,995,749 B2 | 2/2006 | Friend |
| 7,024,256 B2 * | 4/2006 | Krzyzanowski et al. ....... 700/65 |
| 7,032,181 B1 | 4/2006 | Farcasiu |
| 7,039,394 B2 | 5/2006 | Bhaskaran |
| 7,039,679 B2 | 5/2006 | Mendez et al. |
| 7,064,688 B2 | 6/2006 | Collins et al. |
| 7,092,943 B2 | 8/2006 | Roese et al. |
| 7,184,801 B2 | 2/2007 | Farcasiu |

(Continued)

*Primary Examiner* — Danh Le

(57) ABSTRACT

Mobile device management macros may be provided. A request to perform a function may be received. If the function is associated with a management macro comprising a plurality of operations, the macro may be activated to perform at least some of the plurality of operations.

10 Claims, 3 Drawing Sheets

(56) References Cited

U.S. PATENT DOCUMENTS

| | | |
|---|---|---|
| 7,191,058 B2 | 3/2007 | Laird et al. |
| 7,203,959 B2 | 4/2007 | Nachenberg et al. |
| 7,225,231 B2 | 5/2007 | Mendez et al. |
| 7,228,383 B2 | 6/2007 | Friedman et al. |
| 7,275,073 B2 | 9/2007 | Ganji et al. |
| 7,284,045 B1 | 10/2007 | Marl et al. |
| 7,287,271 B1 | 10/2007 | Riggins |
| 7,308,703 B2 | 12/2007 | Wright et al. |
| 7,310,535 B1 | 12/2007 | MacKenzie et al. |
| 7,353,533 B2 | 4/2008 | Wright et al. |
| 7,363,349 B2 | 4/2008 | Friedman et al. |
| 7,363,361 B2 | 4/2008 | Tewari et al. |
| 7,373,517 B1 | 5/2008 | Riggins |
| 7,437,752 B2 | 10/2008 | Heard et al. |
| 7,444,375 B2 | 10/2008 | McConnell et al. |
| 7,447,506 B1 | 11/2008 | MacKenzie et al. |
| 7,447,799 B2 | 11/2008 | Kushner |
| 7,475,152 B2 | 1/2009 | Chan et al. |
| 7,539,665 B2 | 5/2009 | Mendez |
| 7,565,314 B2 | 7/2009 | Borgeson et al. |
| 7,590,403 B1 | 9/2009 | House et al. |
| 7,594,224 B2 | 9/2009 | Patrick et al. |
| 7,603,547 B2 | 10/2009 | Patrick et al. |
| 7,603,548 B2 | 10/2009 | Patrick et al. |
| 7,603,703 B2 | 10/2009 | Craft et al. |
| 7,617,222 B2 | 11/2009 | Coulthard et al. |
| 7,620,001 B2 | 11/2009 | Ganji |
| 7,620,392 B1 | 11/2009 | Maurya et al. |
| 7,650,491 B2 | 1/2010 | Craft et al. |
| 7,660,902 B2 | 2/2010 | Graham et al. |
| 7,665,118 B2 | 2/2010 | Mann et al. |
| 7,665,125 B2 | 2/2010 | Heard et al. |
| 7,685,645 B2 | 3/2010 | Doyle et al. |
| 7,702,322 B1 | 4/2010 | Maurya et al. |
| 7,702,785 B2 | 4/2010 | Bruton, III et al. |
| 7,735,112 B2 | 6/2010 | Kim et al. |
| 7,735,122 B1 | 6/2010 | Johnson et al. |
| 7,739,334 B1 | 6/2010 | Ng et al. |
| 7,752,166 B2 | 7/2010 | Quinlan et al. |
| 7,788,382 B1 | 8/2010 | Jones et al. |
| 7,792,297 B1 | 9/2010 | Piccionelli et al. |
| 7,840,631 B2 | 11/2010 | Farcasiu |
| 7,890,091 B2 | 2/2011 | Puskoor et al. |
| 7,912,896 B2 | 3/2011 | Wolovitz et al. |
| 7,917,641 B2 | 3/2011 | Crampton |
| 7,970,386 B2 | 6/2011 | Bhat et al. |
| 8,001,082 B1 | 8/2011 | Muratov |
| 8,012,219 B2 | 9/2011 | Mendez et al. |
| 8,041,776 B2 | 10/2011 | Friedman et al. |
| 8,046,823 B1 | 10/2011 | Begen et al. |
| 8,060,074 B2 | 11/2011 | Danford et al. |
| 8,069,144 B2 | 11/2011 | Quinlan et al. |
| 8,078,157 B2 | 12/2011 | Maurya et al. |
| 8,094,591 B1 | 1/2012 | Hunter et al. |
| 8,117,344 B2 | 2/2012 | Mendez et al. |
| 8,150,431 B2 | 4/2012 | Wolovitz et al. |
| 8,166,106 B2 | 4/2012 | Biggs et al. |
| 8,504,831 B2 | 8/2013 | Pratt et al. |
| 8,731,773 B2 * | 5/2014 | Yousefi et al. .................. 701/36 |
| 2002/0013721 A1 | 1/2002 | Dabbiere et al. |
| 2002/0055967 A1 | 5/2002 | Coussement |
| 2003/0065934 A1 | 4/2003 | Angelo et al. |
| 2003/0110084 A1 | 6/2003 | Eberhard et al. |
| 2003/0172166 A1 | 9/2003 | Judge et al. |
| 2003/0204716 A1 | 10/2003 | Rockwood et al. |
| 2004/0060050 A1 * | 3/2004 | Bieringer ...................... 718/102 |
| 2004/0123153 A1 | 6/2004 | Wright et al. |
| 2004/0181687 A1 | 9/2004 | Nachenberg et al. |
| 2004/0224703 A1 | 11/2004 | Takaki et al. |
| 2005/0246192 A1 | 11/2005 | Jauffred et al. |
| 2006/0190984 A1 | 8/2006 | Heard et al. |
| 2007/0033397 A1 | 2/2007 | Phillips, II et al. |
| 2007/0136492 A1 | 6/2007 | Blum et al. |
| 2007/0143603 A1 | 6/2007 | Hadden et al. |
| 2007/0156897 A1 | 7/2007 | Lim |
| 2007/0174433 A1 | 7/2007 | Mendez et al. |
| 2007/0192588 A1 | 8/2007 | Roskind et al. |
| 2007/0260883 A1 | 11/2007 | Giobbi et al. |
| 2007/0288637 A1 | 12/2007 | Layton et al. |
| 2008/0133712 A1 | 6/2008 | Friedman et al. |
| 2008/0134305 A1 | 6/2008 | Hinton et al. |
| 2008/0201453 A1 | 8/2008 | Assenmacher |
| 2009/0036111 A1 | 2/2009 | Danford et al. |
| 2009/0144632 A1 | 6/2009 | Mendez |
| 2009/0198997 A1 | 8/2009 | Yeap et al. |
| 2009/0260064 A1 | 10/2009 | McDowell et al. |
| 2009/0300739 A1 | 12/2009 | Nice et al. |
| 2009/0307362 A1 | 12/2009 | Mendez et al. |
| 2010/0005125 A1 | 1/2010 | Mendez et al. |
| 2010/0005157 A1 | 1/2010 | Mendez et al. |
| 2010/0005159 A1 | 1/2010 | Ishiguro |
| 2010/0005195 A1 | 1/2010 | Mendez et al. |
| 2010/0023630 A1 | 1/2010 | Mendez et al. |
| 2010/0100641 A1 | 4/2010 | Quinlan et al. |
| 2010/0120450 A1 | 5/2010 | Herz |
| 2010/0144323 A1 | 6/2010 | Collins et al. |
| 2010/0146269 A1 | 6/2010 | Baskaran |
| 2010/0254410 A1 | 10/2010 | Collins |
| 2010/0268844 A1 | 10/2010 | Quinlan et al. |
| 2010/0273456 A1 | 10/2010 | Wolovitz et al. |
| 2010/0299152 A1 | 11/2010 | Batchu et al. |
| 2010/0299362 A1 | 11/2010 | Osmond |
| 2010/0299376 A1 | 11/2010 | Batchu et al. |
| 2010/0299719 A1 | 11/2010 | Burks et al. |
| 2011/0004941 A1 | 1/2011 | Mendez et al. |
| 2011/0082900 A1 | 4/2011 | Nagpal et al. |
| 2011/0113062 A1 | 5/2011 | Quinlan et al. |
| 2011/0145932 A1 | 6/2011 | Nerger et al. |
| 2011/0153779 A1 | 6/2011 | Mendez et al. |
| 2011/0153799 A1 | 6/2011 | Ito |
| 2011/0167474 A1 | 7/2011 | Sinha et al. |
| 2011/0202589 A1 | 8/2011 | Piernot et al. |
| 2011/0225252 A1 | 9/2011 | Bhat et al. |
| 2011/0270799 A1 | 11/2011 | Muratov |
| 2011/0276805 A1 | 11/2011 | Nagpal et al. |
| 2011/0296186 A1 | 12/2011 | Wong et al. |
| 2011/0320552 A1 | 12/2011 | Friedman et al. |
| 2012/0005578 A1 | 1/2012 | Hawkins |
| 2012/0015644 A1 | 1/2012 | Danford et al. |
| 2012/0102392 A1 | 4/2012 | Reesman et al. |
| 2012/0198547 A1 | 8/2012 | Fredette et al. |
| 2012/0204032 A1 | 8/2012 | Wilkins et al. |
| 2013/0061307 A1 | 3/2013 | Livne |
| 2013/0152169 A1 | 6/2013 | Stuntebeck |

* cited by examiner

DEVICE MANAGEMENT MACROS

BACKGROUND

In some situations, mobile devices may be subject to policy controls that prevent or complicate tasks to which users of those devices have become accustomed. For example, an Information Technology (IT) administrator may deploy a policy to devices used by employees of a company that disables access to a mobile application store. In such a conventional approach, users who wish to install a new application may simply be denied access to the application store, even if the new application would be approved for installation.

SUMMARY

This Summary is provided to introduce a selection of concepts in a simplified form that are further described below in the Detailed Description. This Summary is not intended to identify key features or essential features of the claimed subject matter nor is this Summary intended to be used to limit the claimed subject matter's scope.

Mobile device management macros may be provided. A request to perform a function may be received. If the function is associated with a management macro comprising a plurality of operations, the macro may be activated to perform at least some of the plurality of operations.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
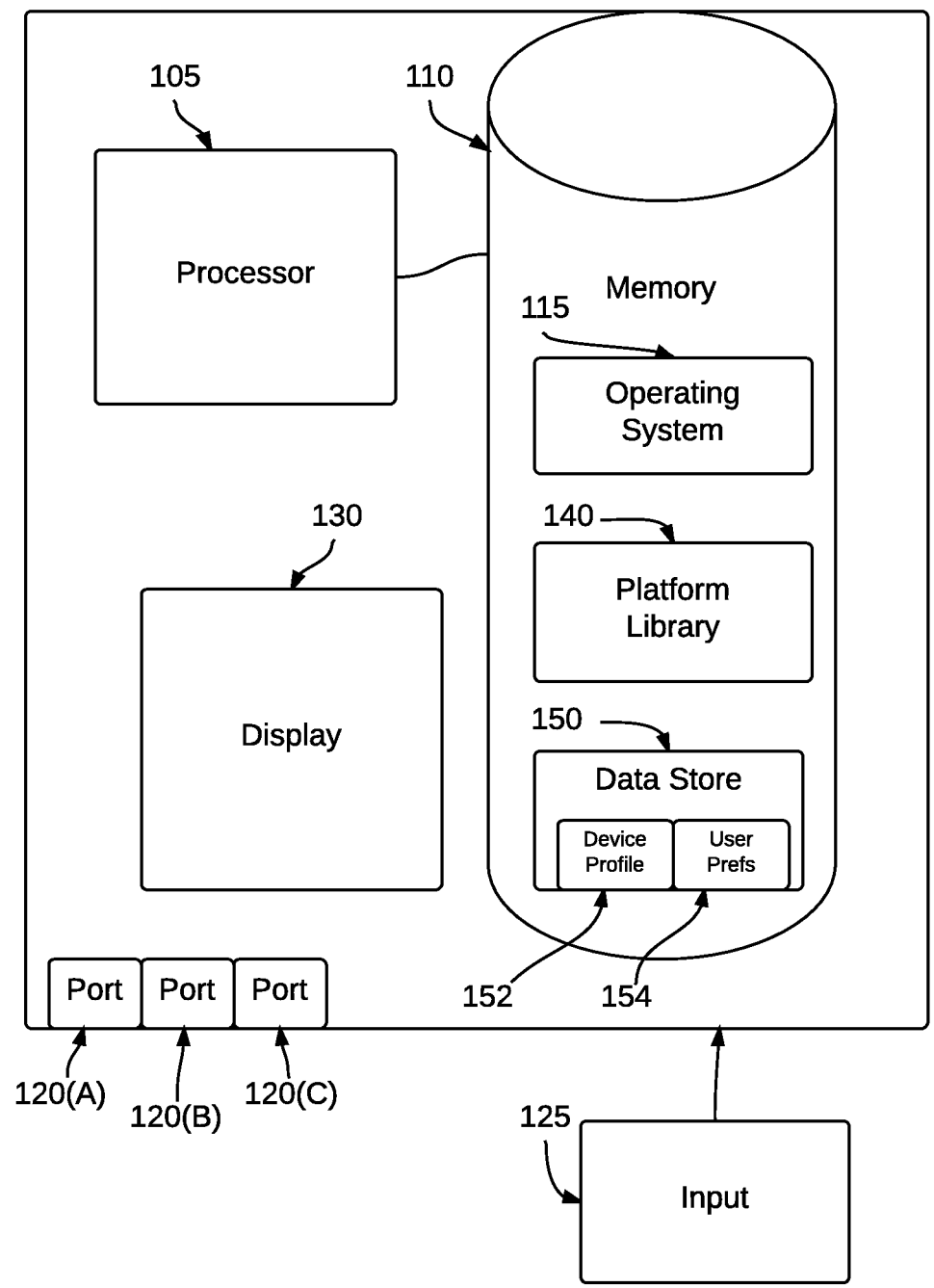
FIG. 1 is a block diagram of a user device.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Device management macros may be provided. A macro may comprise a set of operations to be performed in order to accomplish a function in accordance with one or more management policies. Such macros may comprise an ordered series of steps and/or steps that may be performed in any order and/or simultaneously.

For example, under normal circumstances, a mobile device's access to an application store may be disabled. When a user of the device wishes to install a new application, a macro may be executed that determines, for example, whether the specific application is permitted to be installed or if the application falls within an allowed category of applications (e.g., productivity), enables access to the application store, downloads the application, disables access to the application store again, installs the application, and logs an event report to the device and/or a management server.

For another example, a requested function may require use of a limited and/or audited resource, such as a data plan or call minute allocation. Similarly, the requested function may be one that incurs a financial charge, such as the purchase of an application or the use of international data roaming. Such audited resources may be incorporated into the macros as conditional policies that must be satisfied before the requested function is completed.

In some embodiments, a determination of whether the requested function is associated with enterprise or personal use may also be made. For example, when a data allocation is approaching a monthly limit, crossing a first threshold of remaining data (e.g., less than 20% remaining) may cause requests to retrieve email from a personal account to be postponed, to wait until a non-metered data connection (e.g., wireless instead of cellular) is available, or be set at longer intervals. Similar requests to retrieve email from a work account, however, may not meet such restrictions until a second threshold (e.g., less than 5% remaining) is crossed. In other cases, a user's role (e.g., executive) may allow them to exceed the data allocation without facing these restrictions, but an expense record may be prepared for charges associated with exceeding the data allocation.

In some embodiments, audited resources may be limited in use when costs exceed a threshold. For example, when a mobile device user is traveling internationally, rates for data usage may be much more expensive than when the user is in their home country. Macros may be available to allow performance of requested data usage functions up to a limited amount per day, for example, or may allow only certain data transmissions, such as sending and/or downloading emails marked as high priority/urgent or only downloading new and/or unread messages.

Another example of a requested function may comprise a request for secure data. A macro may perform various operations such as activating a virtual private network (VPN), downloading the data securely, waiting for a given period or for an application viewing the data to close, wiping the memory segment that had dynamically stored the secure data, and deactivating the VPN.

FIG. 1 is a block diagram of a user device 100 comprising a processor 105 and a memory 110. Depending on the configuration and type of device, memory 110 may comprise, but is not limited to, volatile (e.g. random access memory (RAM)), non-volatile (e.g. read-only memory (ROM)), flash memory, or any combination. Memory 110 may store executable programs and related data components of various applications and modules for execution by user device 100. Memory 110 may be coupled to processor 105 for storing configuration data and operational parameters, such as commands that are recognized by processor 105.

Basic functionality of user device 100 may be provided by an operating system 115 contained in memory 100. One or more programmed software applications may be executed by utilizing the computing resources in user device 100. Applications stored in memory 110 may be executed by processor 105 (e.g., a central processing unit or digital signal processor) under the auspices of operating system 115. For example, processor 105 may be configured to execute applications such as web browsing applications, email applications, instant messaging applications, and/or other applications capable of receiving and/or providing data.

Data provided as input to and generated as output from the application(s) may be stored in memory 110 and read by processor 105 from memory 110 as needed during the course of application program execution. Input data may be data stored in memory 110 by a secondary application or other source, either internal or external to user device 100, or possibly anticipated by the application and thus created with the application program at the time it was generated as a software application program. Data may be received via any of a plurality of communication ports 120(A)-(C) of user device 100. Communication ports 120(A)-(C) may allow user device 100 to communicate with other devices, and may comprise components such as an Ethernet network adapter, a modem, and/or a wireless network connectivity interface. For example, the wireless network connectivity interface may comprise one and/or more of a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like.

User device 100 may also receive data as user input via an input component 125, such as a keyboard, a mouse, a pen, a stylus, a sound input device, a touch input device, a capture device, etc. A capture device may be operative to record user(s) and capture spoken words, motions and/or gestures, such as with a camera and/or microphone. The capture device may comprise any speech and/or motion detection device capable of detecting the speech and/or actions of the user(s).

Data generated by applications may be stored in memory 110 by the processor 105 during the course of application program execution. Data may be provided to the user during application program execution by means of a display 130. Consistent with embodiments of this disclosure, display 130 may comprise an integrated display screen and/or an output port coupled to an external display screen.

Memory 110 may also comprise a platform library 140. Platform library 140 may comprise a collection of functionality useful to multiple applications, such as may be provided by an application programming interface (API) to a software development kit (SDK). These utilities may be accessed by applications as necessary so that each application does not have to contain these utilities thus allowing for memory consumption savings and a consistent user interface.

Furthermore, embodiments of this disclosure may be practiced in conjunction with a graphics library, other operating systems, or any other application program and is not limited to any particular application or system. The devices described with respect to the Figures may have additional features or functionality. For example, user device 100 may also include additional data storage devices (removable and/or non-removable) such as, for example, magnetic disks, optical disks, or tape (not shown).

User device 100 may comprise a desktop computer, a laptop computer, a personal digital assistant, a cellular telephone, a set-top box, a music player, a web pad, a tablet computer system, a game console, and/or another device with like capability.

User device 100 may store in a data store 150 a device profile 152 and a plurality of user preferences 154. Device profile 152 may comprise an indication of the current position of user device 100 and/or indications of the hardware, software, and security attributes which describe user device 100. For instance, device profile 152 may represent hardware specifications of user device 100, version and configuration information of various software program and hardware components installed on user device 100, data transmission protocols enabled on user device 100, version and usage information of various resources stored on user device 100, and/or any other attributes associated with the state of user device 100. The device profile 152 may further comprise data indicating a date of last virus scan of user device 100, a date of last access by an IT representative, a date of last service by the IT representative, and/or any other data indicating maintenance and usage of user device 100. Furthermore, the device profile 152 may comprise indications of the past behavior of associated users, such as resources accessed, charges for resource accesses, and the inventory accessed from such resources. User preferences 154 may comprise a listing of factors that may affect the experience of the user. In particular, user preferences 154 may include indications of the user's age, gender, bodily traits, preferred resource types, preferred venue resources, and combinations thereof.

Figure 2:
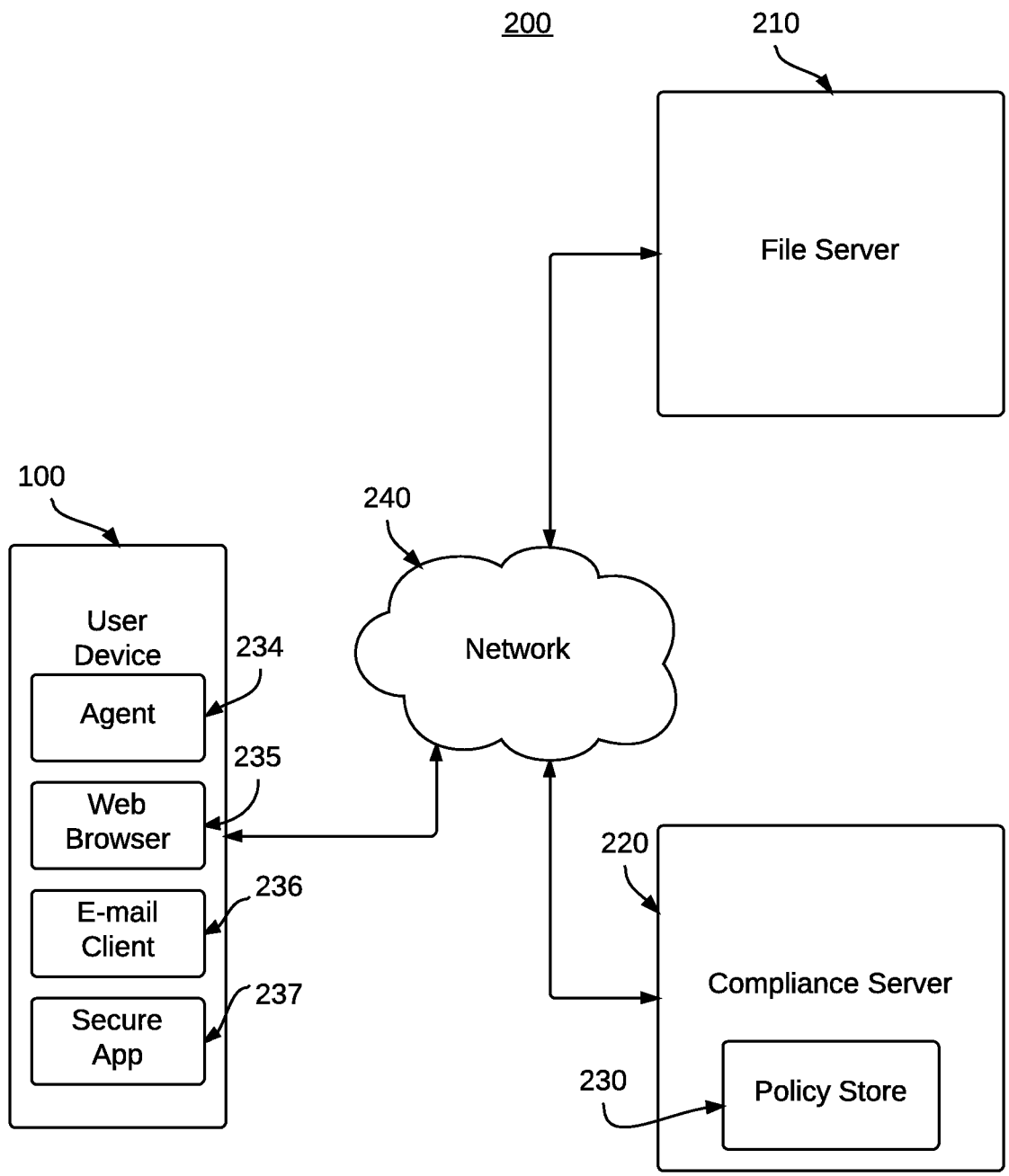
FIG. 2 is a block diagram of an operating environment.

FIG. 2 is a block diagram view of an operating environment 200 comprising user device 100 in communication with a file server 210 and a compliance server 220 via a network 240. The compliance server 220 may comprise, for example, cloud-based solutions, server computers and/or any other system providing device management capability. For purposes of convenience, the compliance server 220 is referred to herein in the singular, although it is understood that a plurality of servers may be employed in the arrangements as descried herein. Furthermore, in some embodiments, multiple compliance servers 220 may operate on the same server computer. The components executed on the compliance server 220, for example, may comprise various applications, services, processes, systems, engines, or functionality not disclosed in detail herein.

The compliance server 220 may comprise a policy store 230 comprising a plurality of compliance rules and/or policies that may be applicable to user device 100. While the policy store 230 is shown as within the compliance server 220, the policy store 230 may alternately be within the user device 100 and/or remotely located on the file server 210 and may be remotely updated periodically by compliance server 220 according to common over-the-air (OTA) updating methods. Attempts by user device 100 to perform certain functionality on user device 100 may require user device 100 to be in compliance with one and/or more of the compliance policies/rules. Depending on the sensitivity of a given functionality, different compliance rules may be necessary to ensure that the functionality is adequately restricted. Some functionality may only require ensuring that the proper user is requesting the functionality. Other resources may require compliance with more stringent authorization rules, such as determining whether the functionality is restricted during certain time windows. Accordingly, user device 100 and/or compliance server 220 may be operative to determine whether the user of user device 100 is authorized to perform requested functionality at the time the user requests to perform such functionality.

In some embodiments, an agent application 234 executed on user device 100 may make the compliance determination based on the device profile, credentials, and/or user preferences. For instance, the agent application 234 may monitor calls by applications, such as a web browser 235, an e-mail client 236, and/or a secure application 237, on user device 110 to the operating system 115 of user device 100 to determine whether user device 110 seeks to perform functionality associated with a given compliance rule. Additionally, the agent application 234 on user device 100 may approve and/or deny the associated functionality requests. For instance, the agent application 234 may instruct operating system 115 on user device 100 to disable the camera of user device 100 in response to a determination that a compliance rule specifies that the camera cannot be used at the time of the request by the user device 100 to operate the camera.

In some embodiments, the agent application 234 executed on user device 100 may rely on compliance server 220 to determine whether a given functionality request on user device 100 is permitted according to the compliance rules. For instance, the agent application may transmit a functionality request, a device profile, credentials, and/or user preferences to compliance server 220 so that compliance server 220 may determine whether user device 110 seeks to perform functionality that may violate a given compliance rule. Additionally, compliance server 220 may approve and/or deny the associated functionality requests. For instance, compliance server 220 may instruct the agent application 234 on user device 100 to instruct operating system 115 to activate a VPN security profile prior to opening a document and/or link.

In some embodiments, the compliance rules may comprise device settings and/or executable instructions that define which functionality the operating system 115 of user device 100 is authorized to perform. Furthermore, the compliance rules may comprise a list of functions, such as those provided by APIs associated with operating system 115 and/or platform library 140, that may be treated as protected functions. Calls to these functions, such as calls to retrieve login credentials, may result in checks by user device 100 and/or compliance server 220 for compliance with the compliance rules.

In some embodiments, the agent 234 may perform a set of ordered operations to accomplish a requested function. These operation sets may be defined by the user device 100 and/or compliance server 220 and may comprise one and/or more operations to determine whether the user device 100 is in compliance with policies from policy store 230. The agent 234 may control at least one respective computing resource of the user device 100. The operations may include configuring at least one respective computing resource of the user device 100 such as restricting access to at least one resource managed by the agent 234.

The Network 240 may comprise, for example, any type of wired and/or wireless network such as a wireless local area network (WLAN), a wireless wide area network (WWAN), Ethernet, fiber-optic network, and/or any other type of wired and/or wireless network now known or later developed. Additionally, the Network 240 may be or include the Internet, intranets, extranets, microwave networks, satellite communications, cellular systems, PCS, infrared communications, global area networks, or other suitable networks, etc., or any combination of such networks.

Figure 3:
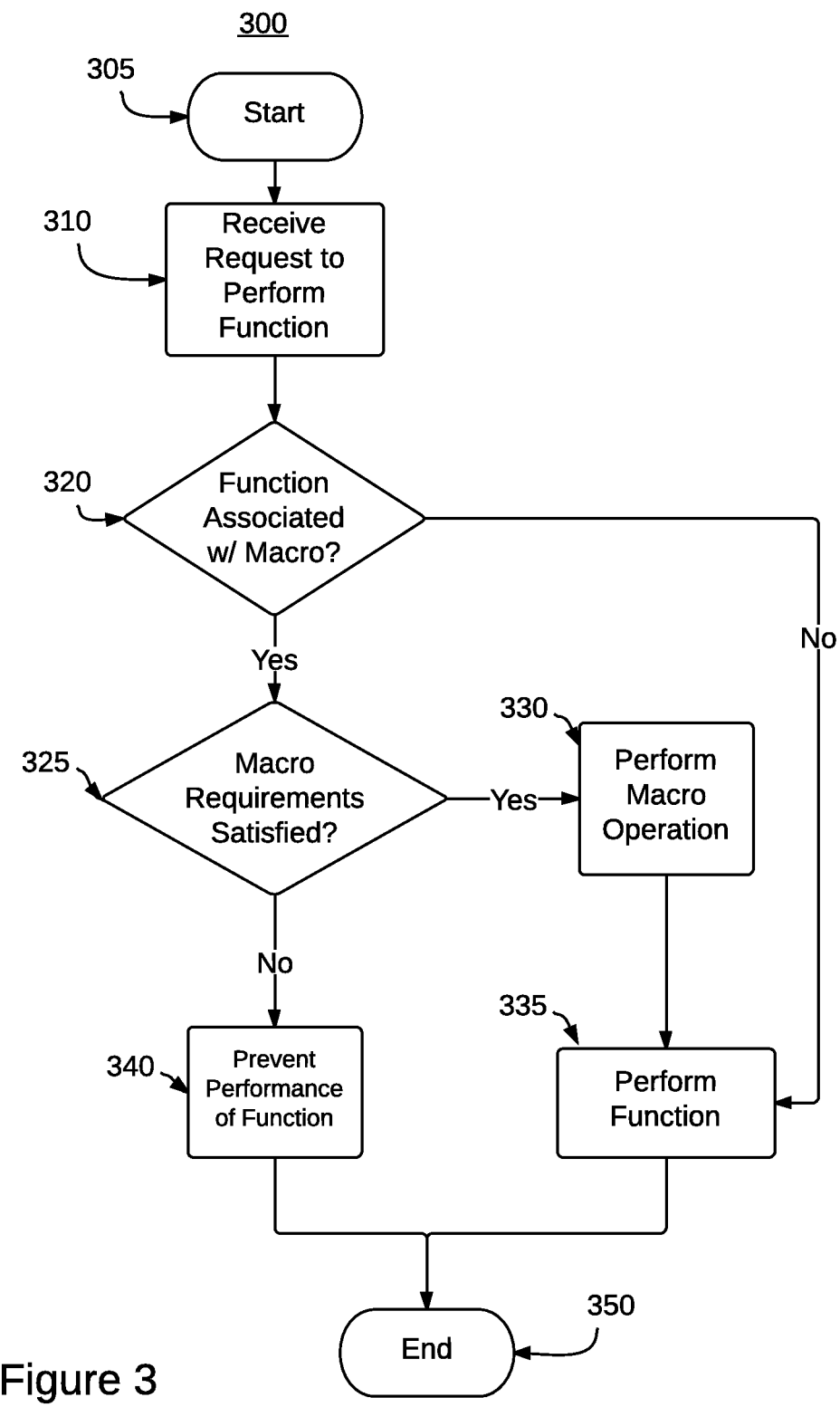
FIG. 3 is a flow chart illustrating a method for providing mobile device management macros.

FIG. 3 is a flow chart setting forth the general stages involved in a method 300 consistent with embodiments of this disclosure for providing device management macros. Method 300 may be implemented using elements of operating environment 200 as described above. Ways to implement the stages of method 300 will be described in greater detail below.

Method 300 may begin at starting block 305 and proceed to stage 310 where user device 100 may receive a request to perform a function. For example, user device 100 may attempt to install a new application or retrieve secure data.

From stage 310, method 300 may advance to stage 320 where user device 100 may determine whether the function is associated with a management macro. For example, the agent 234 may comprise a plurality of macros for performing various tasks. An application install macro may comprise a plurality of operations to be performed in response to receiving a request to install a new application, while a data transmission macro may comprise operations associated with requests to utilize network 240.

If the requested function is determined to be associated with a macro at stage 320, method 300 may advance to stage 325 where user device 100 may determine whether the macro's requirements are satisfied. For example, the macro may be associated with one and/or more policy requirements from compliance server 220, such as requiring that a user have entered some form of authentication (e.g., biometric, password, securID, etc.) before performing the requested function. In some embodiments, the macro's requirements may depend on a determination of whether the requested function is associated with a personal or enterprise task. For example, enterprise tasks may require greater security and/or may be permitted to perform actions not allowed for personal tasks.

If the macro requirements are determined to be satisfied at stage 325, method 300 may advance to stage 330 where user device 100 may perform at least one of a plurality of operations associated with the macro. For example, an application install macro may enable access to a source for the application (e.g., a remote server acting as an application store), download the application to be installed, and disable access to the source once more. For another example, the macro may determine whether surcharges (e.g., international call/data roaming rates or call time/data allocation excess charges) will apply in performing the requested function, request confirmation of the requested action, and/or create an event log report of the requested function.

Once the macro operations have been performed at stage 330, or if no macro was determined to be required at stage 320, method 300 may advance to stage 335 where the requested function may be performed. For example, the requested application may be installed or requested data retrieved and displayed.

If the macro requirements are not satisfied at stage 325, method 300 may proceed to stage 340 where user device 100 may prevent the requested function from being performed. In some embodiments, functions that are not associated with management macros at stage 320 may also be prevented from being performed at stage 340. For example, user device 100 may refuse to download and/or install the requested new application. Method 300 may then end at stage 350.

An embodiment consistent with the disclosure may comprise a system for providing device management macros. The system may comprise a memory storage and a processing unit coupled to the memory storage. The processing unit may be operative to receive a request to perform a function, determine whether the function is associated with a management macro comprising a plurality of operations, and, if so, activate the management macro, wherein being operative to activate the management macro comprises being operative to performing at least a subset of the plurality of operations. For example, when the function comprises a request to install an application, one of the macro operations may comprise determining whether the application comprises an authorized application and/or whether access to an application source is active Another embodiment consistent with the disclosure may comprise a system for providing device management macros. The system may comprise a memory storage and a processing unit coupled to the memory storage. The processing unit may be operative to receive a request to perform a function, determine whether the function is associated with at least one of a plurality of management macros each comprising a plurality of operations, and in response to determining that the function is associated with the at least one management macro comprising the plurality of operations, perform the plurality of operations. When the requested function is not associated with a management macro, the processor may be configured to prevent or allow the requested function to be performed.

Yet another embodiment consistent with the disclosure may comprise a system for providing device management macros. The system may comprise a memory storage and a processing unit coupled to the memory storage. The processing unit may be operative to receive a request to perform a function, determine whether the function is associated with a management macro comprising a plurality of ordered operations, and, in response to determining that the function is associated with the management macro, activate the management macro.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EE-PROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving a request to perform a function, the function comprising a request to install an application;
determining whether the function is associated with a management macro comprising a plurality of operations, wherein at least one of the plurality of operations comprises determining whether the application comprises an authorized application;
in response to determining that the request to install the application is associated with the management macro, activating the management macro by determining whether the application comprises the authorized application, wherein activating the management macro comprises performing at least a subset of the plurality of operations;
in response to determining that the application comprises the authorized application, determining whether access to an application source is active;
in response to determining that access to the application source is not active, activating access to the application source;
installing the application from the application source; and
deactivating access to the application source.

2. The method of claim 1, wherein the function further requires the use of an audited resource.

3. The method of claim 2, wherein the function further comprises placing a call and the audited resource comprises a call time allocation.

4. The method of claim 2, wherein the function further comprises a network transmission and the audited resource comprises a data allocation.

5. The method of claim 1, wherein at least one of the plurality of operations of the management macro comprises determining whether the requested function comprises a personal request.

6. The method of claim 1, wherein at least one of the plurality of operations of the management macro comprises determining whether the requested function comprises an enterprise request.

7. A system comprising:
a memory storage; and
a processor coupled to the memory storage, wherein the processor is configured to:
receive a request to perform a function, the function comprising a request to install an application,
determine whether the function is associated with at least one of a plurality of management macros each comprising a plurality of operations, wherein the plurality of operations associated with the at least one of the plurality of management macros comprises determining whether access to an application source is active and in response to determining that access to the application source is active, deactivate access to the application source,
in response to determining that the function is associated with the at least one management macro comprising the plurality of operations, perform the plurality of operations, and
in response to determining that the function is not associated with the at least one management macro comprising the plurality of operations, prevent the function from being performed.

8. The system of claim 7, wherein the function requires the use of an audited resource, wherein the audited resource comprises at least one of the following: a call time allocation, a call rate, and a data allocation.

9. A non-transitory computer-readable medium which stores a set of instructions that when executed performs a method executed by the set of instructions comprising:
receiving a request to perform a function;
determining whether the function is associated with a management macro comprising a plurality of ordered operations, wherein at least one of the plurality of ordered operations comprises determining whether the requested function requires the use of an audited resource;
in response to determining that the requested function requires the use of an audited resource, determining whether the requested function is associated with an enterprise function,
in response to determining that the requested function is associated with the enterprise function, determining whether a first threshold associated with the audited resource is satisfied; and
in response to determining that the first threshold associated with the audited resource is satisfied, proceeding with performing the plurality of ordered operations.

10. The non-transitory computer-readable medium of claim 9, further comprising instructions that:
in response to determining that the requested function is not associated with an enterprise function, determine whether a second threshold associated with the audited resource is satisfied; and
in response to determining that the second threshold associated with the audited resource is not satisfied, halt the performing of the plurality of ordered operations.

* * * * *